United States Patent
Guthrie

(10) Patent No.: US 9,038,971 B1
(45) Date of Patent: May 26, 2015

(54) MOBILE COMPUTING PLATFORM HOLDING DEVICE

(71) Applicant: Beau Thomas Guthrie, Novato, CA (US)

(72) Inventor: Beau Thomas Guthrie, Novato, CA (US)

( * ) Notice: Subject to any disclaimer, the term of this patent is extended or adjusted under 35 U.S.C. 154(b) by 0 days.

(21) Appl. No.: 13/694,287

(22) Filed: Nov. 14, 2012

(51) Int. Cl.
 F16M 13/02 (2006.01)
 F16M 11/04 (2006.01)
 F16M 11/40 (2006.01)

(52) U.S. Cl.
 CPC ............ F16M 13/022 (2013.01); F16M 11/041 (2013.01); F16M 11/40 (2013.01); Y10S 248/917 (2013.01)

(58) Field of Classification Search
 CPC ... F16M 11/041; F16M 11/40; F16M 13/022; B60R 2011/007; B60R 2011/0057; B60R 11/02; A47G 1/17
 USPC ........... 248/206.5, 309.4, 683, 467, 688, 160, 248/177.1, 128, 121, 122.1, 451, 454, 457, 248/917, 370, 371; 361/379.01–679.02, 361/679.04, 679.06–679.07, 679.21, 361/679.01–679.02; 414/793.2, 797.1, 606, 414/737, 749.2; 294/2, 86.4, 65.5, 190
 See application file for complete search history.

(56) References Cited

U.S. PATENT DOCUMENTS

| | | | |
|---|---|---|---|
| 6,412,837 B2 * | 7/2002 | Futa | 294/3 |
| 7,582,828 B2 * | 9/2009 | Ryan | 174/50 |
| D654,054 S * | 2/2012 | Kohte et al. | D14/217 |
| D658,651 S * | 5/2012 | Lee et al. | D14/452 |
| 8,238,086 B2 * | 8/2012 | Ou | 361/679.21 |
| 8,459,599 B2 * | 6/2013 | Du et al. | 248/181.1 |
| D691,148 S * | 10/2013 | Weatherby, III | D14/447 |
| D692,439 S * | 10/2013 | Muhlenberg | D14/447 |
| 8,706,175 B2 * | 4/2014 | Cho | 455/575.8 |
| 2002/0117593 A1 * | 8/2002 | Richter | 248/309.1 |
| 2004/0211868 A1 * | 10/2004 | Holmes et al. | 248/231.71 |
| 2007/0114344 A1 * | 5/2007 | Sage | 248/160 |
| 2010/0252696 A1 * | 10/2010 | Sage | 248/160 |
| 2012/0160973 A1 * | 6/2012 | Du et al. | 248/121 |
| 2012/0175474 A1 * | 7/2012 | Barnard et al. | 248/122.1 |
| 2012/0241567 A1 * | 9/2012 | Gillespie-Brown et al. | 248/122.1 |
| 2012/0252543 A1 * | 10/2012 | Cho | 455/575.8 |
| 2012/0273630 A1 * | 11/2012 | Gillespie-Brown et al. | 248/122.1 |
| 2013/0221189 A1 * | 8/2013 | Kubin | 248/683 |

* cited by examiner

Primary Examiner — Ingrid M Weinhold
(74) Attorney, Agent, or Firm — Risto A. Rinne, Jr.

(57) ABSTRACT

An apparatus for the holding of an IPAD® or other mobile computing platform includes a magnetic arm assembly connected to a first end of a flexible shaft. A ferric metal circle is adhered to a back panel of the IPAD®. A center magnet provided within a center of the magnetic arm assembly which applies a force to the metal circle sufficient to retain the IPAD®, thereto. A plurality of flexible arms extends radially from the center magnet and bear against a protective case that retains the IPAD®. An opposite second end of the flexible shaft is connected to a base member. The base member may include a threaded clamp, a spring clamp, a suction cup or a weighted base, depending on the desired location for holding the IPAD®.

15 Claims, 6 Drawing Sheets

MOBILE COMPUTING PLATFORM HOLDING DEVICE

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention, in general, relates to computing platform accessories and, more particularly, to a device to hold an IPAD® or other electronic tablets in a desired position.

Tablets, such as an IPAD®, have become a valuable asset that is used in many people's daily lives. They afford a person a compact version of a computer that is readily available and easy to transport. As used herein, the term "tablet" includes any preferred type of a mobile computing platform.

Another version of the tablet is an e-reader. An e-reader is a compact device meant for viewing and reading books. The e-readers provide a user to select and download any available desired book for a small fee. The e-reader provides convenient reading of a book at any desired location without the need of carrying around the book itself. In particular, a lightweight, thin e-reader may contain many books and magazines, thereby allowing expanded reading options without ever having to transport one book or magazine.

As technology is rapidly growing, numerous types and versions of tablets are becoming available to consumers. The tablets help people with school and work while also providing a person with content for their enjoyment. For many people, tablets are quickly becoming a preference over laptop and even desktop computers.

Tablets also offer a convenient way to access the Internet and provide users with many of the same capabilities provided with a desktop computer or a laptop computer. The tablets are designed to be thin, lightweight and portable. Due to these qualities, sales of tablets are on the rise.

Many tablets include an option to download various applications for use on the tablet. These applications, commonly referred to as "apps," can be purchased for a fee or are sometimes offered at no charge. The apps allow a person to personalize their tablet with content that appertains to any of their desired interests or needs.

The apps may include social networking, photo sharing, games, business tools, or any other preferred type of content. The apps are generally provided in a marketplace type setup where a user can scroll through the various apps and select which apps are desired for purchase and downloading to their tablet.

The tablets include a touch screen which is used to navigate through the content provided on the tablet. One hand typically holds the tablet while the other hand (or finger of the other hand) is used on the touch screen.

While a person is using a tablet, their head is generally disposed in a looking-down orientation to view the screen. After a period of time has elapsed while in this position, fatigue of the neck muscles is likely to occur. A tablet user can feel a stiff neck or other muscle aches after prolonged tilting of their head to look down at the tablet screen.

Prior art tablet holders provide users with a hands-free holding of the tablet but typically do not provide a sufficient height to raise the tablet to eye-level. A user will still need to look down at the tablet disposed within the prior art holder. Additionally the prior art tablet holders do not provide means to securely attach the tablet to the holder during use. If the tablet is not securely held in place, as the person is using the touch screen, the tablet is likely to shift its position within the prior art holder, or worse, may fall.

Prior art holders also typically include a stationary holder that does not permit a person to move the tablet within the holder to a desired angle. A person may desire to angle the table a certain way to comfortably use the tablet while sitting down or driving in a vehicle. Also, if a person is standing up, it may be desirable to have the tablet held in an elevated position with respect to the person's height.

It is also desirable to have a tablet holder that can properly support a tablet for use within a vehicle. Many apps available on the tablets include maps or navigational aids. Should the person be traveling to unfamiliar areas, convenient access to maps and driving directions is desired.

Many states are enforcing hands-free driving. This requires a driver to maintain both hands on the wheel and not hold any other object or device while driving. If a person is using a tablet to receive navigational driving directions, a holding device for the tablet is required to adhere to the hand-free driving law. If a person uses a tablet without a holding device and they are caught by law enforcement, a ticket and fine is likely to be imposed onto the driver of the vehicle.

It is important for any holding device to securely retain the tablet. This is especially true in environments with vibration, such as in a motor vehicle.

However, this presents a conflict of needs. On one hand, a holding device is desired that can securely retain the tablet in a preferred viewing angle and orientation. On the other hand, rapid connection of the table to the holding device is desired as is rapid removal of the tablet from the holding device. Prior art solutions fail to provide the desired balance of secure holding and easy installation and removal.

There are also numerous other environments where holding the tablet is desired. For example, many people use their tablets while standing in the kitchen or while seated on a sofa in a living room, or when laying or sitting in bed. There is a need for a holding device that can be used in any of these or other environments, as desired, or moved from one environment to another that is quite different.

Therefore, a holding device that can readily adapted for use in different environments is needed. For example, while seated on the sofa, some users would prefer a holding device that was placed on an end table or a coffee table while other users would prefer a holding device that was placed directly on the floor. Similarly, other users would prefer a holding device that was clamped onto an edge of the end table or coffee table or to a kitchen cabinet.

In a motor vehicle, certain users would prefer a holding device that was placed on the floor of the vehicle, while others would prefer a holding device that included a clamp for attachment where desired, while others would prefer a holding device with a suction-type of mount that attached to the windshield or another smooth or glass surface in the vehicle.

Accordingly, there exists today a need for a mobile computing platform holding device that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, such a device would be useful and desirable.

2. Description of Prior Art

Mobile computing platform holding devices are, in general, known. For example, the following patent documents describe various types of these devices, some of which may have some degree of relevance to the invention. Other patent documents listed below may not have any significant relevance to the invention. The inclusion of these patent documents is not an admission that their teachings anticipate any aspect of the invention. Rather, their inclusion is intended to present a broad and diversified understanding regarding the current state of the art appertaining to either the field of the invention or possibly to other related or even distal fields of invention.

U.S. Pat. No. 8,128,046 to Howard, Jr., that issued on Mar. 6, 2012;

U.S. Pat. No. 7,861,985 to Galvin, that issued on Jan. 4, 2011;

U.S. Pat. No. 7,431,251 to Carnevali, that issued on Oct. 7, 2008;

U.S. Pat. No. 7,374,142 to Carnevali, that issued on May 20, 2008;

U.S. Pat. No. 6,888,940 to Deppen, that issued on May 3, 2005;

U.S. Pat. No. 5,992,807 to Tarulli, that issued on Nov. 30, 1999; and

U.S. Pat. No. 4,842,174 to Sheppard, et al., that issued on Jun. 27, 1989.

And including U.S. Design patents:

U.S. Design Pat. No. D636,778 to Corsini, et al., that issued on Apr. 26, 2011;

U.S. Design Pat. No. D636,777 to Corsini, et al., that issued on Apr. 26, 2011;

U.S. Design Pat. No. D521,990 to Richter, that issued on May 30, 2006; and

U.S. Design Pat. No. D502,956 to Holmes, et al., that issued on Mar. 15, 2005.

And including U.S. Patent Application Publications:

U.S. Patent Application Publication No. 2012/0119047 to Lumpkin, et al., that published on May 17, 2012;

U.S. Patent Application Publication No. 2012/0100398 to Lee, that published on Apr. 26, 2012; and U.S. Patent Application Publication No. 2007/0034753 to Lee, that published on Feb. 15, 2007.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a mobile computing platform holding device that provides support for an electronic tablet.

It is also an important object of the invention to provide a mobile computing platform holding device that provides support for an IPAD®.

Another object of the invention is to provide a mobile computing platform holding device that provides support for an e-reader.

Another object of the invention is to provide a mobile computing platform holding device that provides support for any desired mobile computing platform.

Still another object of the invention is to provide a mobile computing platform holding device that includes a plurality of flexible arm members.

Still yet another object of the invention is to provide a mobile computing platform holding device that includes a plurality of flexible arm members that each include a magnet.

Yet another important object of the invention is to provide a mobile computing platform holding device that includes a plurality of flexible arm members that each include a friction enhancing surface.

Still yet another important object of the invention is to provide a mobile computing platform holding device that includes a center magnet.

A first continuing object of the invention is to provide a mobile computing platform holding device that includes a flexible shaft.

A second continuing object of the invention is to provide a mobile computing platform holding device that includes a flexible shaft of any desired length.

A third continuing object of the invention is to provide a mobile computing platform holding device that includes a flexible shaft of any desired diameter.

A fourth continuing object of the invention is to provide a mobile computing platform holding device that includes a flexible gooseneck shaft that can be urged into and retained in any desired direction.

A fifth continuing object of the invention is to provide a mobile computing platform holding device that includes a desired base.

A sixth continuing object of the invention is to provide a mobile computing platform holding device that includes a clamp for a base.

A seventh continuing object of the invention is to provide a mobile computing platform holding device that includes a spring clamp for a base.

An eighth continuing object of the invention is to provide a mobile computing platform holding device that includes a suction cup for a base.

A ninth continuing object of the invention is to provide a mobile computing platform holding device that includes a weighted base.

A tenth continuing object of the invention is to provide a mobile computing platform holding device that includes a base that can be secured to a windshield of a vehicle.

An eleventh continuing object of the invention is to provide a mobile computing platform holding device that includes a base that can be secured to a dashboard of a vehicle.

A twelfth continuing object of the invention is to provide a mobile computing platform holding device that includes a base that can be placed upon a planar surface.

A thirteenth continuing object of the invention is to provide a mobile computing platform holding device that includes a base that can be placed on a floor.

A fourteenth continuing object of the invention is to provide a mobile computing platform holding device that includes a base that can be secured to any type of cabinet.

A fifteenth continuing object of the invention is to provide a mobile computing platform holding device that includes a base that can be clipped to any desired surface.

A sixteenth continuing object of the invention is to provide a mobile computing platform holding device that includes a base that can be clamped to any desired surface.

A seventeenth continuing object of the invention is to provide a mobile computing platform holding device that permits hands-free holding of a tablet, an e-reader or desired mobile computing platform.

An eighteenth continuing object of the invention is to provide a mobile computing platform holding device that includes a metal circle that is attached to a back cover of an IPAD® or other mobile computing platform.

A nineteenth continuing object of the invention is to provide a mobile computing platform holding device that includes a metal circle that is attached to a back cover of an IPAD® or other mobile computing platform and wherein the mobile computing platform holding device includes a center magnet that makes contact with the metal circle to secure the IPAD® or other mobile computing platform to the mobile computing platform holding device.

A twentieth continuing object of the invention is to provide a mobile computing platform holding device that includes a metal ring that is attached to a back cover of an IPAD® or other mobile computing platform and which is concentrically disposed around a metal circle that is also attached to the back cover, and a center magnet that makes contact with the metal circle and three or more support magnets that are each attached to a support end of three or more flexible arms that, together, help secure the IPAD® or other mobile computing platform to the mobile computing platform holding device.

A twenty-first continuing object of the invention is to provide a mobile computing platform holding device that includes a plastic cover that is placed over a back of an IPAD® or other mobile computing platform and a metal circle that is attached to a back cover of an IPAD® or other mobile computing platform, and wherein a hole is provided through the plastic cover to expose the metal circle, and wherein the mobile computing platform holding device includes a center magnet that makes contact with the metal circle to secure the IPAD® or other mobile computing platform to the mobile computing platform holding device.

Briefly, a mobile computing platform holding device that is constructed in accordance with the principles of the present invention has a magnetic arm assembly that holds any desired mobile computing platform or tablet, such as an IPAD®. A thin ferric metal circle is adhered (i.e., glued) to a back panel of the IPAD® at a center location, thereof. The metal circle is magnetically attracted to a center magnet provided within a center of the magnetic arm assembly of the mobile computing platform holding device. Preferably a smaller concentric secondary metal ring is also adhered to the back panel of the IPAD®. The secondary metal ring is concentrically around the metal circle. The IPAD® is placed within a plastic case that has been modified (i.e., cut) to expose the metal circle on the back panel of the IPAD®. Material is removed from the plastic case to expose the metal circle. The secondary metal ring is disposed under the plastic case. Material is not typically removed to expose the secondary metal ring. The magnetic arm assembly includes a plurality of flexible arms which extend radially outward from the center magnet of the mobile computing platform holding device. Three or more of the flexible arms may be included; however four flexible arms are preferred. An end portion of each of the flexible arms preferably includes a magnet. If desired, the end portions may include a friction-enhancing surface such as an elastomer or rubber to help further secure the IPAD® to the magnetic arm assembly. A first retaining plate is provided proximate a first end of the flexible arms. A bolt head is provided within an interior of the first retaining plate. A threaded rod extends down from the bolt head through a second retaining plate. The first and second retaining plates apply a force to secure the flexible arms in position proximate the center magnet. A first nut is provided below the second retaining plate. The threaded rod extends downward through the first nut. The threaded rod is connected to a female first end of a flexible shaft. The flexible shaft supports the magnetic arm assembly of the mobile computing platform holding device, and, therefore, the IPAD® or other desired type of mobile computing platform or tablet. The flexible shaft may include any desired length and diameter. An opposite second female end of the flexible shaft is connected to a base member. The base member may include any desired type of base including a threaded clamp, a spring clamp, a suction cup or a weighted base. The desired location for placement or attachment of the mobile computing platform holding device determines which base member is necessary. To use the mobile computing platform holding device, a rear surface of the IPAD® is placed over the magnetic arm assembly. The IPAD® is lowered over the magnetic arm assembly until the metal circle on the back of the IPAD® is magnetically attracted to the center magnet of the magnetic arm assembly. If included, the magnets on the end portions of the flexible arms are attracted to the secondary metal ring disposed under the plastic case housing the IPAD® and provide additional holding force. The IPAD® can be rotated about the center magnet to provide any desired tilt or to correct any tilt that may be present. The flexible shaft is urged (i.e., bent) to any desired position to provide ease of viewing a screen of the IPAD®. The flexible shaft retains the IPAD® in whatever position the flexible shaft is placed. To remove the IPAD® from the magnetic arm assembly, the IPAD® is grasped and urged away from the center magnet of the magnetic arm assembly and away from the magnetic arm assembly.

DETAILED DESCRIPTION OF THE INVENTION

Figure 1:
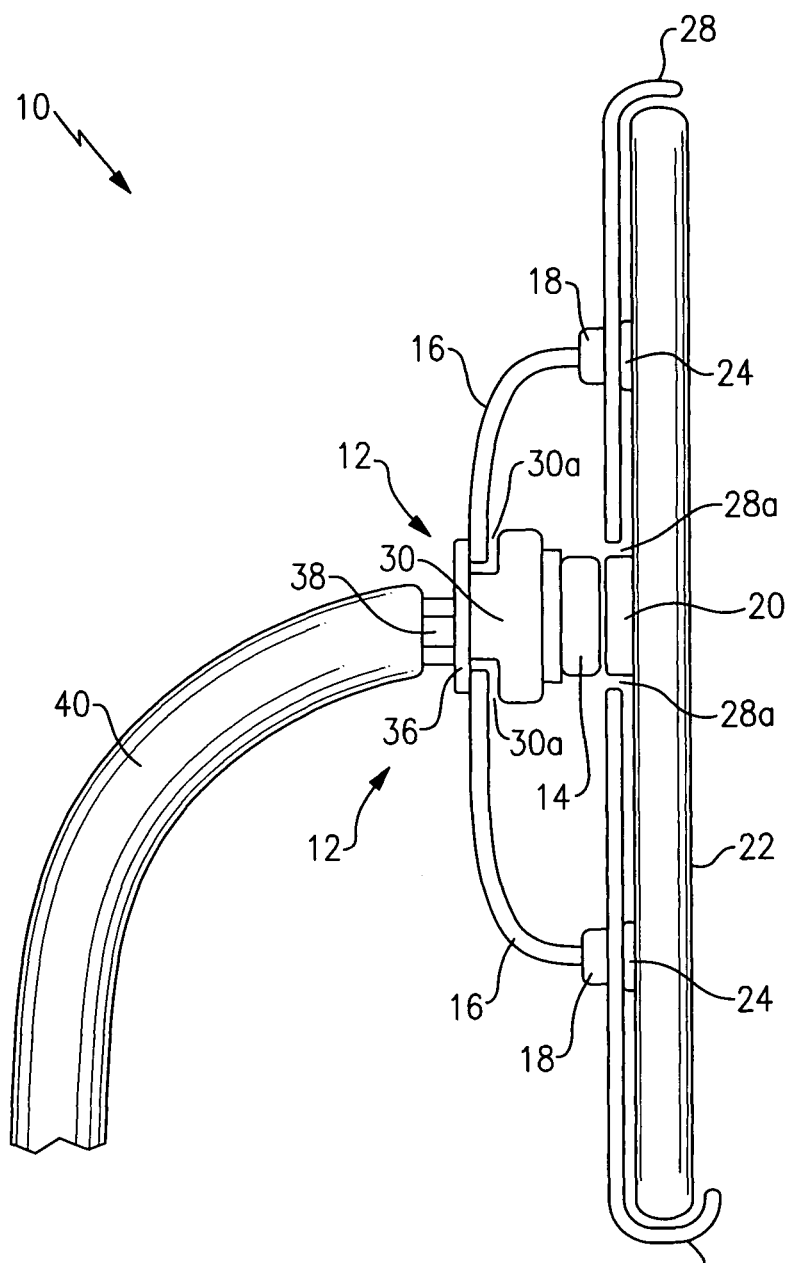
FIG. 1 is a cross-sectional side view of a portion of a mobile computing platform holding device with an IPAD® or other computing platform attached, thereto.

Referring on occasion to all of the FIGURE drawings and now, in particular to FIG. 1, is shown a mobile computing platform holding device, identified in general, by the reference numeral 10.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

Certain examples are shown in the above-identified FIGURES and are described in greater detail below. In describing these examples, like or identical reference numerals may be used to identify common or similar elements.

The mobile computing platform holding device 10 includes a magnetic arm assembly, identified in general, by reference numeral 12. The magnetic arm assembly 12 includes a center magnet 14. The center magnet 14 is a large flat magnet located within a center of the magnetic arm assembly 12.

A plurality of flexible arms 16 extend radially outward from the center magnet 14. At least three flexible arms 16 are included with the mobile computing platform holding device 10; however four flexible arms 16 are preferred. The four flexible arms 16 are comprised of an elastomeric material (i.e., rubber or other similar material) to permit the flexible arms 16 to bend. The flexible arms 16 can include any desired stiffness or softness.

The desired application for the mobile computing platform holding device 10 determines the stiffness or softness of the flexible arms 16. For example, if the mobile computing platform holding device 10 is to be used within a vehicle (not shown), the flexible arms 16 are preferably comprised of a stiffer material to better absorb vibration. However, should the mobile computing platform holding device 10 be used in a home, a softer material may be used for the flexible arms 16.

The flexible arms 16 each include a support end 18. The support end 18 includes an enlarged portion that is provided on a distal end of each flexible arm 16. The support ends 18 will be described in greater detail, hereinafter.

A metal circle 20 is adhered (i.e., glued) or otherwise secured to a center of a back panel of an IPAD® 22 or other similar electronic tablet, e-reader, or any other desired mobile computing platform. The mobile computing platform holding device 10 is designed to support any desired electronic tablet or mobile computing platform including the IPAD® 22 and other current or future devices.

The metal circle 20 is not currently included on the IPAD® 22 and is attached to the IPAD® 22 after purchase of the IPAD® 22. The metal circle 20 is comprised of a thin ferric (i.e., metallic) material that is magnetically attracted to the center magnet 14.

If desired, an optional secondary metal ring 24 is adhered concentrically around the metal circle 20 a predetermined distance from the metal circle 20. The secondary metal ring 24 is preferably a small approximately one-quarter inch wide ferric ring that, when included, is attracted to optional support magnets 26 provided in the support ends 18 of the flexible arms 16.

The IPAD® 22 is fitted within a protective plastic case 28. The plastic case 28 is a standard case designed for use with the IPAD® 22. The plastic case is modified to accommodate usage with the mobile computing platform holding device 10.

A hole 28a is cut by any preferred means (or molded) in a back panel of the plastic case 28. The hole 28a is made slightly larger than a diameter of the metal circle 20. The metal circle 20 is exposed through the hole 28a provided in the plastic case 28. This permits the metal circle 20 to be exposed and therefore to make direct contact with the center magnet 14 once the IPAD® 22 is properly placed proximate the magnetic arm assembly 12 of the mobile computing platform holding device 10.

The secondary metal ring 24 is disposed under the plastic case 28. The secondary metal ring 24 is intended to help align and better secure the IPAD® 22 with respect to the magnetic arm assembly 12. It is not necessary for the secondary metal ring 24 to be in direct contact with the support magnets 26 provided on the support ends 18 of the flexible arms 16. Sufficient magnetic flux is able to pass through the thin plastic case 28 and attract the support magnets 26 to the secondary metal ring 24. However, if desired, the plastic case 28 could be further modified to expose at least a portion of the secondary metal ring 24.

To secure the IPAD® 22 to the magnetic arm assembly 12, the metal circle 20 located on the back panel of the IPAD® 22 is aligned with the center magnet 14. The center magnet 14 is attracted to the metal circle 20 thus urging the IPAD® 22 closer to a center of the magnetic arm assembly 12. The center magnet 14 secures the IPAD® 22 securely in place adjacent to the magnetic arm assembly 12.

The support ends 18 of the flexible arms 16 apply a force to the outside of the plastic case 28 that further improves stability of the IPAD® 22. If included, the support magnets 26 on the support ends 18 of the flexible arms 16 provide a slight magnetic attraction through the plastic case 28 to the secondary metal ring 24 that provide even greater stability to the IPAD® 22.

The support magnets 26 may be omitted from the support ends 18, if desired. The support ends 18 may, instead, include a friction-enhancing surface such as rubber or other elastomeric material to help hold the IPAD® 22 in position on the magnetic arm assembly 12. The support ends 18 may alternately include a smooth surface, if desired, such as a smooth plastic surface.

The flexible arms 16 allow rotation of the IPAD® 22 about a center of the metal circle 20 with respect to the magnetic arm assembly 12 of the mobile computing platform holding device 10. Furthermore, the flexible arms 16 provide tension against the back panel of the plastic case 28 housing the IPAD® 22, thereby further helping to secure the IPAD® 22 to the magnetic arm assembly 12.

The flexible arms 16 also provide a significant unexpected benefit. The flexible arms 16 help stabilize the IPAD® 22 upon the magnetic arm assembly 12. In a quiescent state (i.e., prior to placement of the IPAD® 22 onto the magnetic arm assembly 12) the flexible arms 16 are facing slightly forward beyond the plane of the center magnet 14. After placement of the IPAD® 22 onto the flexible arms 16, the flexible arms 16 are pushed back slightly and away from the center magnet 14. The flexible arms 16 provide tension against the IPAD® 22 as the flexible arms 16 try to return to their quiescent state. The tension provided by the flexible arms 16 helps retain the IPAD® 22 in place, especially during vibration of the mobile computing platform holding device 10 (i.e., when the mobile computing platform holding device 10 is used with a vehicle).

The flexible arms 16 additionally permit easy removal of the IPAD® 22 from the magnetic arm assembly 12. The flexible arms 16 allow a person (not shown) to remove the IPAD® 22 from the magnetic arm assembly 12 with one hand. As the IPAD® 22 is being lifted upward away from the center magnet 14, the flexible arms 16 actually help push the IPAD® 22 away from the magnetic arm assembly 12 as they return to their quiescent state. While the flexible arms 16 are returning to the quiescent state, the flexible arms 16 push against the IPAD® 22 helping guide its removal off of the magnetic arm assembly 12.

Figure 2:
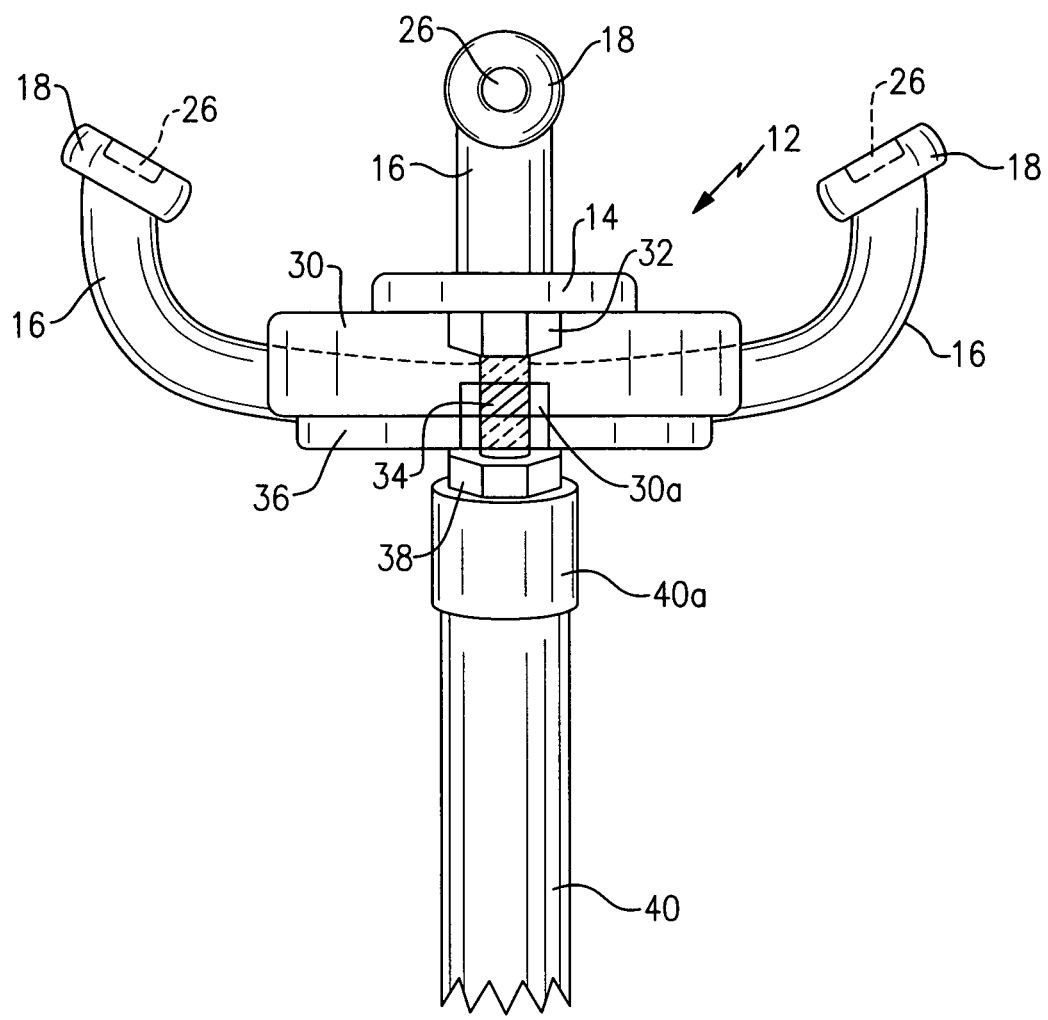
FIG. 2 is a side view of a magnetic arm assembly of the mobile computing platform holding device of FIG. 1 without an IPAD® or other computing platform attached, thereto.

Now referring to FIG. 2, the flexible arms 16 are secured in position on the magnetic arm assembly 12 by a first retaining plate 30. An interior of the first retaining plate 30 includes a bolt head 32. The bolt head 32 is attached to a remaining portion of the bolt that includes a threaded rod 34. The center magnet 14 is attached to the bolt head 32 by adhesive or other means, as desired. The first retaining plate 30 is disposed under the center magnet 14 and above the flexible arms 16. A rectangular recess 30a is provided in a perimeter of the first retaining plate 30 where each flexible arm 16 is located. The front-most flexible arm 16 is omitted from the FIG. 2 drawing to provide clarity of view of the center portion of the magnetic arm assembly 12. The rectangular recess 30a retains each one of flexible arms 16 in position.

The threaded rod 34 extends downward from the bolt head 32 through a hole provided in a second retaining plate 36. The second retaining plate 36 is disposed under the flexible arms 16. The flexible arms 16 are disposed between the first retaining plate 30 and the second retaining plate 36. A first nut 38 is included underneath the second retaining plate 36. The first nut 38 is tightened on the threaded rod 34 to urge the second retaining plate 36 upward. The center magnet limits upward movement of the first retaining plate 30, which tightens the flexible arms 16 in position.

It is noted that the flexible arms 16 are shown in their quiescent position in FIG. 2. Referring briefly to FIG. 1, the flexible arms 16 are shown in a retracted position in which the support ends 18 are disposed on a plane that includes the surface of the center magnet 14. The flexible arms 16 are under increased tension in the retracted position where they each apply a force tending to urge the IPAD® 22 away from the center magnet 14. Surprisingly, instead of weakening the bond between the IPAD® 22 and the center magnet 14, the force applied by the flexible arms 16 strengthens the bond. This is because the force applied by the flexible arms 16 helps prevent an angular change from occurring between the plane of IPAD® 22 and the plane of the surface of the center magnet 14. This, in turn, keeps the center magnet 14 firmly seated against the metal circle 20 which helps to maintain attachment of the IPAD® 22 to the mobile computing platform holding device 10.

The threaded rod 34 extends downward beyond the first nut 38 and screws into a threaded female end 40a of a flexible shaft 40 to attach the magnetic arm assembly 12 to the flexible shaft 40. If desired, the flexible shaft 40 may include a male end (not shown), which screws into a modified first nut 38 (not shown) that includes an extended longitudinal length.

The flexible shaft 40 may include any desired length and diameter depending on the desired usage of the mobile computing platform holding device 10. Any desired material may be used for the flexible shaft 40 that permits urging of the flexible shaft 40 into a desired position and which retains the flexible shaft 40 in the desired position. A more rigid material may be used for the flexible shaft 40 should the mobile computing platform holding device 10 be used in a vehicle (not shown) or any other location where vibration or increased g-forces may be present. A more easily bendable gooseneck type of the flexible shaft 40 may be desired for use within a home or upon a desk.

The flexible shaft 40 includes an opposite male end 40b (partially shown in dashed lines in FIGS. 3-6) located on an opposite end of the flexible shaft 40 with respect to the female end 40a. The male end 40b is connected to a second nut 42 attached to a base member 44. The base member 44 may include any desired base to support the mobile computing platform holding device 10, as described in greater detail, hereinafter.

Figure 3:
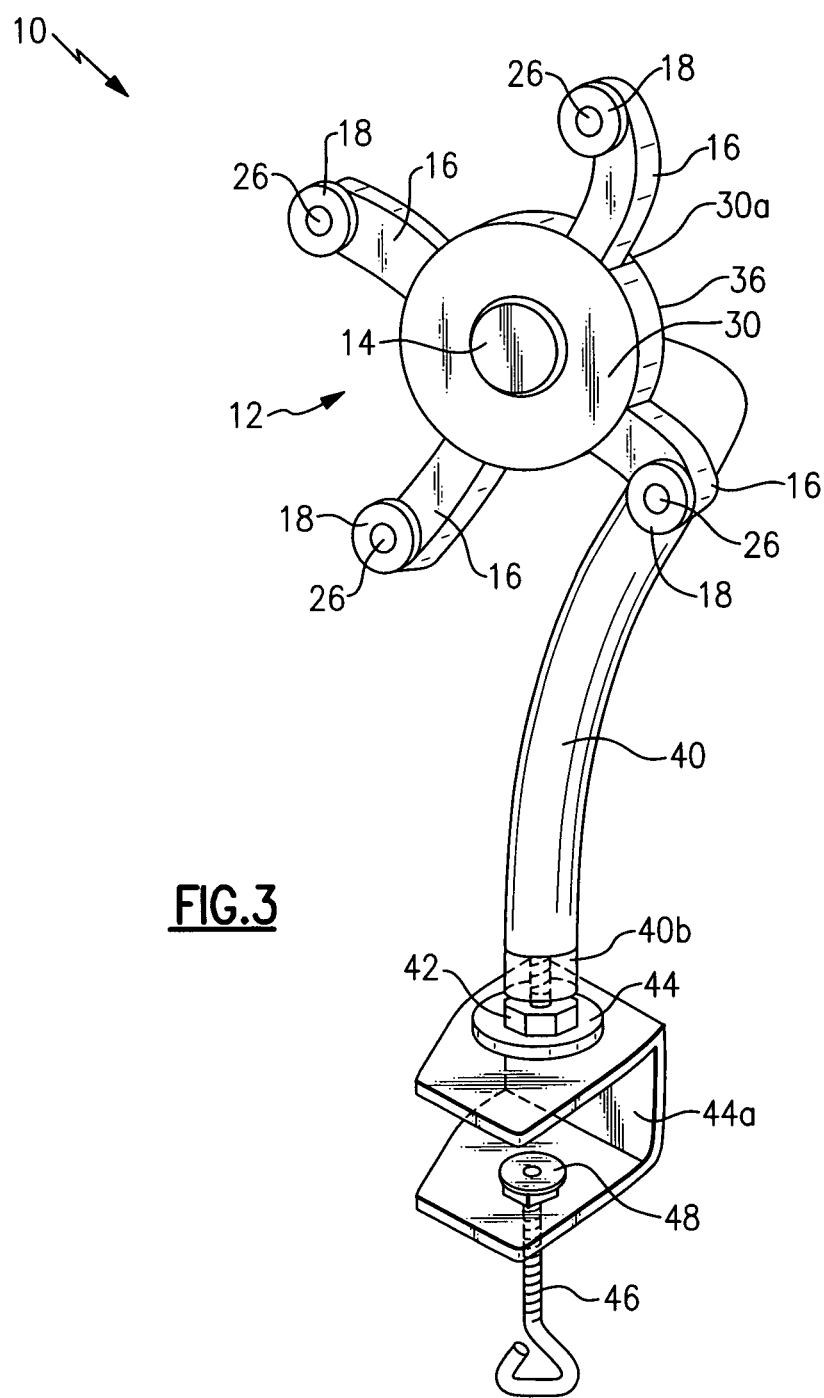
FIG. 3 is a view in perspective of the mobile computing platform holding device of FIG. 1 with a threaded clamp base without an IPAD® or other computing platform attached, thereto.

Now referring primarily to FIG. 3, a threaded clamp base 44a is shown attached to the male end 40b if the flexible shaft 40 of the mobile computing platform holding device 10. The threaded clamp base 44a permits the mobile computing platform holding device 10 to be secured to any desired planar surface such as a table or desk (not shown).

The threaded clamp base 44a includes a threaded tightening member 46. The tightening member 46 is turned clockwise or counter-clockwise to lift and lower a pad 48 included on an upper end of the tightening member 46.

Prior to placement of the clamp base 44a onto a table or desk, the tightening member 46 is turned to lower the pad 48 so that the pad 48 is in contact with a lower portion of the clamp base 44a. The threaded clamp base 44a is placed onto an edge of the table or desk and the tightening member 46 is turned in the opposite direction a sufficient amount to raise the pad 48 until the pad 48 is in contact with an underside of the table or desk and secure the mobile computing platform holding device 10 to the table or desk.

Additionally, the threaded clamp base 44a may be used to secure the mobile computing platform holding device 10 to a kitchen cabinet (not shown). The cabinet door is opened and the threaded clamp base 44a is inserted over a bottom shelf (not shown) or other structural member of the kitchen cabinet. The tightening member 46 is turned to raise the pad 48 until the pad 48 is firmly in contact with an underside of the bottom shelf or structural member of the kitchen cabinet.

The flexible shaft 40 is urged (i.e., bent) to a desired angle to bring the magnetic arm assembly 12 into an upright position and provide an optimum viewing position for the IPAD® 22. The placement of the mobile platform computing holding device 10 in the kitchen permits a person to use the IPAD® 22 while cooking or eating within the kitchen. The IPAD® 22 may contain recipes which can be easily followed since the IPAD® 22 is placed at a raised position near eye level. Additionally, the IPAD® 22 is not placed directly onto a counter of the kitchen thus avoiding contact with any food present within the kitchen while also keeping precious kitchen counter space open.

When use of IPAD® 22 in the kitchen is no longer desired, the flexible shaft 40 of the mobile computing platform holding device 10 can be bent under the cabinet for convenient out-of-the-way storage of the IPAD® or the mobile computing platform holding device 10 can be moved to a new location. If desired, the threaded clamp base 44a can be removed from the flexible shaft 40 and another base (as described below) can be used.

Figure 4:
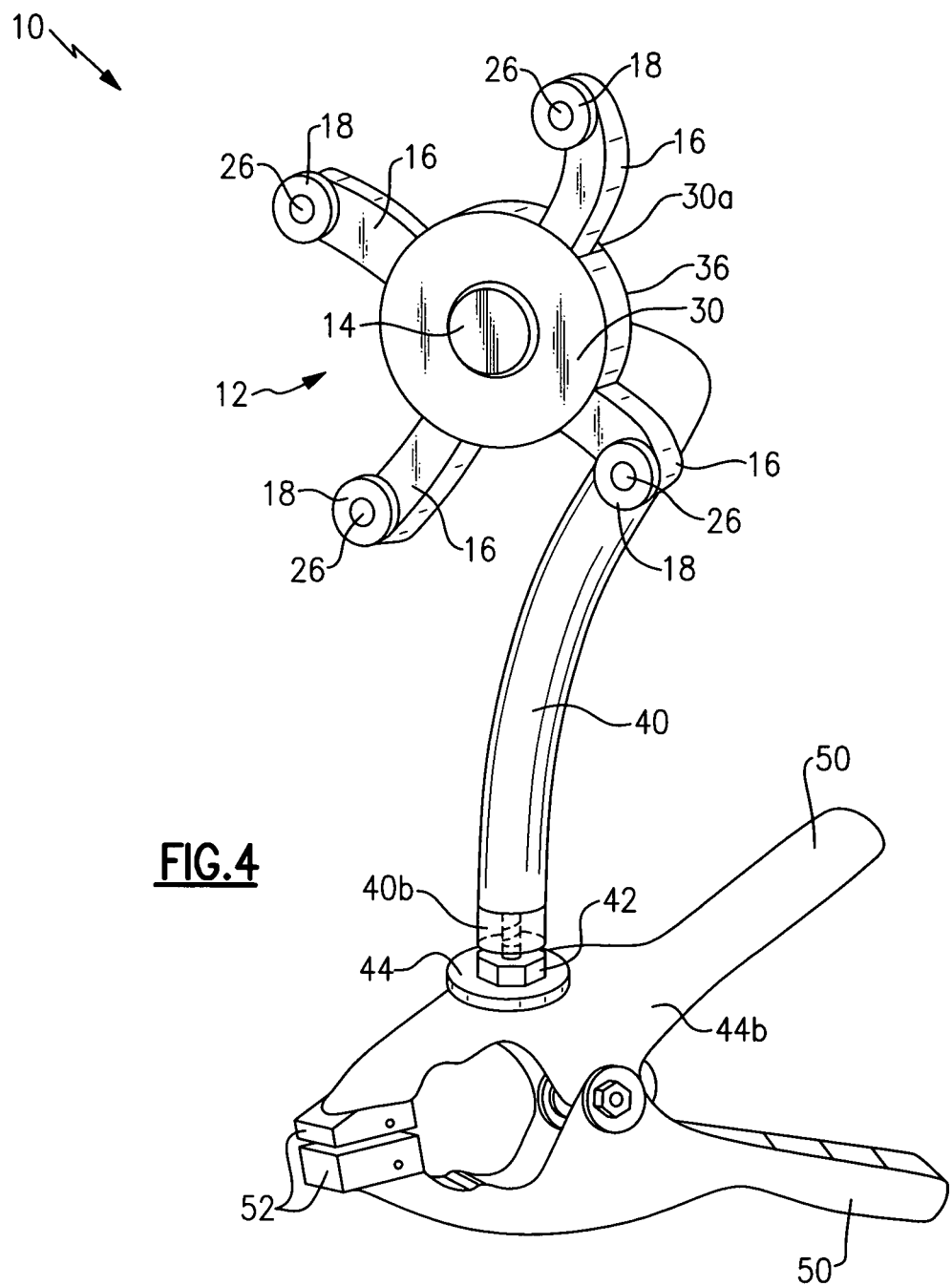
FIG. 4 is a view in perspective of the mobile computing platform holding device of FIG. 1 with a spring clamp base without an IPAD® or other computing platform attached, thereto.

Now referring to FIG. 4, a spring clamp base 44b is shown attached to the male end 40b of the flexible shaft 40 of the mobile computing platform holding device 10. The spring clamp base 44b enables the mobile computing platform holding device 10 to be quickly clipped or clamped on to any desired surface or object.

The spring clamp base 44b includes a pair of handles 50 that are grasped and squeezed to open a pair of jaw members 52. The jaw members 52 are opened and placed over any desired surface or object. The handles 50 are released to secure jaw members 52 of the spring clamp base 44b in position. The spring base clamp 44b may clamped onto an underside of a dashboard or to any convenient location in a vehicle (not shown) to secure the mobile computing platform holding device 10 within the vehicle.

As the content included on the IPAD® 22 may contain helpful maps and navigation directions, providing a hands-free holding of the IPAD® 22 while driving is desirable. As many states are enforcing hands-free driving laws, use of the mobile computing platform holding device 10 within a vehicle provides an important unexpected benefit. The hands-free law requires a driver to keep both hands on the wheel while driving. The magnetic arm assembly 12 retains the IPAD® 22 in place thus allowing the driver of the vehicle to keep both hands on the wheel and not violate the hand-free driving law.

If desired, the flexible shaft 40 can be designed to be stiffer and less flexible if the mobile computing platform holding device 10 is to be used within the vehicle. The stiffer flexible shaft 40 retains the magnetic arm assembly 12 and the IPAD® 22 in a more stationary position while the vehicle is in motion. If desired, the threaded clamp base 44a may instead be used within the vehicle.

Figure 5:
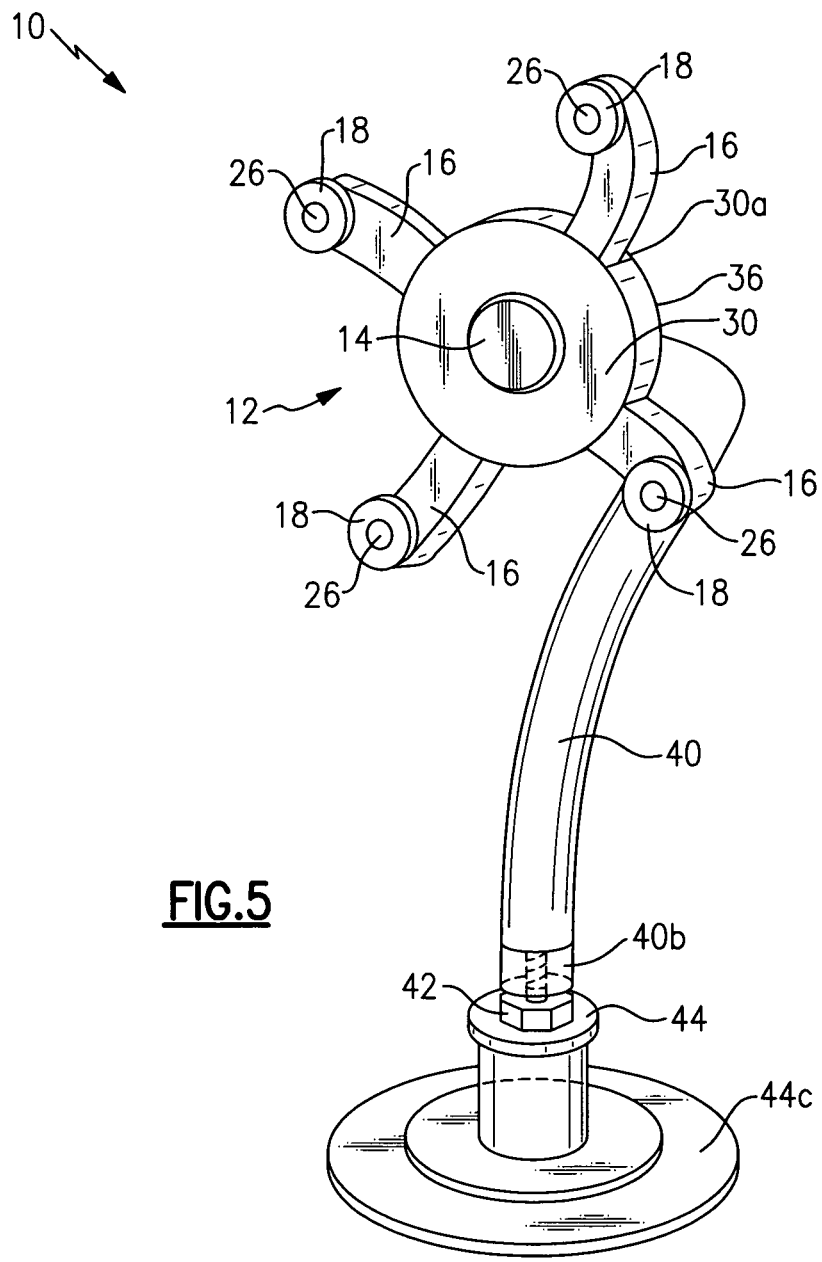
FIG. 5 is a view in perspective of the mobile computing platform holding device of FIG. 1 with a suction cup base without an IPAD® or other computing platform attached, thereto.

Now referring to FIG. 5, a suction cup base 44c is shown attached to the male end 40b of the flexible shaft 40 of the mobile computing platform holding device 10. The suction cup base 44c secures the mobile computing platform holding device 10 to a window or windshield (not shown) of the vehicle. Additionally, the suction cup base 44c may be placed onto any desired planar surface within the vehicle or any other desired planar surface elsewhere.

Instead of clamping the mobile computing platform holding device 10 in the vehicle with the threaded clamp base 44a or the spring clamp base 44b, the suction cup base 44c allows the mobile computing platform holding device 10 to be readily secured to the windshield of the vehicle.

The suction cup base 44c is placed against the windshield (or window) and pressure is applied to the suction cup base 44c to secure it to the windshield (or window). The suction cup base 44c places the IPAD® 22 at a higher elevation within the vehicle for easy viewing. Should the driver be using a map on the IPAD® 22, the suction cup base 44c places the IPAD® 22 closer to eye level to allow the driver to glance quickly at a screen of the IPAD® 22 to view the map.

If desired, the flexible shaft 40 may include any preferred length depending on the desired amount of extension of the IPAD® 22 away from the windshield. The flexible shaft 40 may include any desired amount of stiffness or bendability to provide optimal stability and control of the IPAD® 22 within the vehicle.

Figure 6:
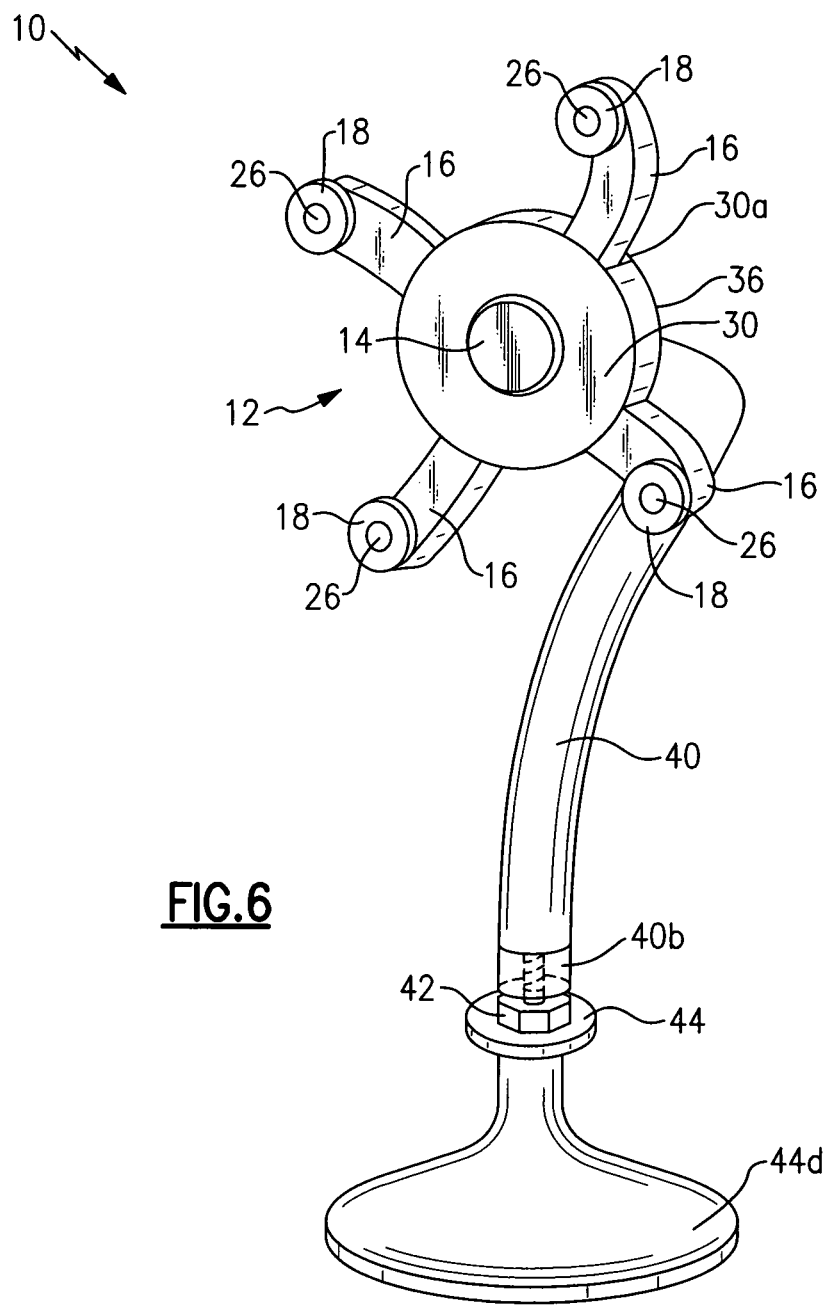
FIG. 6 is a view in perspective of the mobile computing platform holding device of FIG. 1 with a weighted base without an IPAD® or other computing platform attached, thereto.

Now referring to FIG. 6, a weighted base 44d is shown attached to the male end 40b of the flexible shaft 40 of the mobile computing platform holding device 10. The weighted base 44d may include any desired weight to retain the mobile computing platform holding device 10 in an upright position.

The weighted base 44d is placed on a floor, or any type of table (i.e., a coffee table or end table) or a nightstand next to a bed. The flexible shaft 40 may include a longer length than is commonly used with other types of bases 44a-44c. The longer length of the flexible shaft 40 enables the magnetic arm assembly 12 connected to the flexible shaft 40 to be pulled over to a person sitting in a chair or on a sofa or a person lying in a bed (not shown).

The weighted base 44d keeps the mobile computing platform holding device 10 upright while supporting the IPAD® 22 mounted on the magnetic arm assembly 12. As many people enjoy using their IPAD® 22 at home, the weighted base 44d permits the person to enjoy the content on their IPAD® 22 without having to hold the IPAD® 22 in their hands or on their lap.

Prior art mobile computing platform holding devices that hold the IPAD® 22 upright typically include a low profile which requires the person to look down at the screen of the IPAD® 22. With prior art devices, the person has to continually look down to view the content on the screen of the IPAD® 22 and after a period of time the person may begin to experience a sore neck or other discomfort.

The flexible shaft 40 provides any important unexpected benefit. The flexible shaft 40 may be positioned to permit the magnetic arm assembly 12 to maintain the IPAD® 22 in an elevated position in front of the person therefore keeping the screen of the IPAD® 22 proximate a head of the person. The person will not need to bend their neck forward to look down at the screen of the IPAD® 22. This provides a more comfortable positioning of the neck while viewing content on the IPAD® 22. This benefit can be provided with any of the aforementioned bases 44a-44d.

Furthermore, it is to be understood that other modified bases (not shown) may be included on the mobile computing platform holding device 10 other than the bases 44a-44d mentioned herein and illustrated in FIGS. 3-6. The mobile computing platform holding device 10 may be sold with the magnetic arm assembly 12, one or more of the flexible shafts 40, and one or more of the interchangeable bases 44a-44d or the user may be able to purchase any of the component parts separately.

It is important to note that the use of the metal circle 20 prevents excess magnetic flux of the center magnet 14 from penetrating into an interior of the IPAD® 22 and causing damage.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A mobile computing platform holding device for use in securing a mobile computing platform thereto, comprising:
   (a) a magnetic arm assembly that includes a center magnet attached, thereto;
   (b) and wherein said magnetic arm assembly includes a plurality of flexible arms that each include a first end and an opposite second end, and wherein each of said flexible arms includes a flexible or elastomeric material, and wherein each of said flexible arms includes a quiescent state and a retracted state, and wherein said second end of each of said flexible arms is disposed proximate said center magnet, and wherein each of said flexible arms extend radially away from said center magnet;
   (c) a ferric member that is attached to a back of said mobile computing platform;
   (d) a base member;
   (e) a flexible shaft that is attached at a first end thereof to said magnetic arm assembly and is attached at a second end thereof to said base member;

(f) a ferric ring attached to said back of said mobile computing platform, wherein said ferric ring is concentrically disposed around said ferric member, and wherein at least one of said flexible arms includes a support magnet that is attached proximate said first end of said at least one of said flexible arms;

wherein when said mobile computing platform is urged toward said center magnet, said support magnet cooperates with is attracted to said ferric ring, and said center magnet attaches with said ferric member flexing said flexible arms from the quiescent state to the retracted state to secure said mobile computing platform to said magnetic arm assembly.

2. The mobile computing platform holding device of claim 1 wherein said flexible shaft is capable of being urged into a desired position and wherein after being urged into said desired position said flexible shaft is able to remain in said desired position until a sufficient force is applied to said flexible shaft to urge it out of said desired position and into a different position.

3. The mobile computing platform holding device of claim 1 wherein said ferric member includes a ferric circle.

4. The mobile computing platform holding device of claim 3 wherein said ferric circle is adhered to said back of said mobile computing platform.

5. The mobile computing platform holding device of claim 1, wherein when said center magnet is attached to said ferric member each of said flexible arms applies a force to the mobile computing platform.

6. The mobile computing platform holding device of claim 1 wherein said mobile computing platform includes an IPAD®.

7. The mobile computing platform holding device of claim 1 wherein said mobile computing platform includes a tablet, and wherein said tablet includes a microprocessor and a touch-sensitive screen.

8. The mobile computing platform holding device of claim 1 wherein each of said flexible arms includes one of said support magnets, and wherein each of said support magnets cooperates with said ferric ring to attach the flexible arms to the mobile computing platform.

9. The mobile computing platform holding device of claim 1 wherein said mobile computing platform includes a protective case that extends over at least a portion of said back of said mobile computing platform, and wherein said protective case includes a hole provided therein over at least a portion of said ferric member, to permit said center magnet to make contact with said ferric member when said mobile computing platform is urged toward said center magnet.

10. The mobile computing platform holding device of claim 9 wherein said protective case is made of a plastic.

11. The mobile computing platform holding device of claim 1 wherein said magnetic arm assembly includes a male threaded portion that extends therefrom, and wherein said flexible shaft includes a female threaded portion at said first end thereof, and wherein said male threaded portion is able to engage and cooperate with said female threaded portion to secure said magnetic arm assembly to said first end of said flexible shaft.

12. The mobile computing platform holding device of claim 11 wherein said second end of said flexible shaft includes a female thread that is able to engage and cooperate with a male thread portion that is attached to said base member to secure said second end of said flexible shaft to said base member.

13. The mobile computing platform holding device of claim 1 wherein said base member is selected from the group consisting of a threaded clamp base, a spring clamp base, a suction cup base, and a weighted base.

14. The mobile computing platform holding device of claim 2 wherein said flexible shaft includes a predetermined diameter and a predetermined length.

15. The mobile computing platform holding device of claim 8 wherein said mobile computing platform includes a protective case that extends over at least a portion of said back of said mobile computing platform, and wherein said protective case includes a hole provided therein over at least a portion of said ferric member, to permit said center magnet to make contact with said ferric member when said mobile computing platform is urged toward said center magnet, and wherein said ferric ring is disposed under said protective case.

* * * * *